US012374838B1

(12) United States Patent
Lin et al.

(10) Patent No.: US 12,374,838 B1
(45) Date of Patent: Jul. 29, 2025

(54) INTELLIGENT HIGH-POWER GFCI PLUG

(71) Applicant: Wenzhou Huaya Electric Co., Ltd., Wenzhou (CN)

(72) Inventors: Pan Lin, Wenzhou (CN); Jinfeng Chen, Wenzhou (CN)

( * ) Notice: Subject to any disclaimer, the term of this patent is extended or adjusted under 35 U.S.C. 154(b) by 0 days.

(21) Appl. No.: 19/009,185

(22) Filed: Jan. 3, 2025

(30) Foreign Application Priority Data

Oct. 10, 2024 (CN) ......................... 202411405178.4

(51) Int. Cl.
*H01H 83/04* (2006.01)
*H01R 13/66* (2006.01)
*H01R 13/713* (2006.01)

(52) U.S. Cl.
CPC ......... *H01R 13/7135* (2013.01); *H01H 83/04* (2013.01); *H01R 13/6683* (2013.01)

(58) Field of Classification Search
CPC ............ H01R 13/7135; H01R 13/6683; H01H 83/04; H02H 3/105; H02H 3/162; H02H 3/16
USPC ........................................................... 361/42
See application file for complete search history.

(56) References Cited

U.S. PATENT DOCUMENTS

| | | | | |
|---|---|---|---|---|
| 11,626,264 B1 * | 4/2023 | Aromin | H01H 71/58 361/93.1 |
| 2004/0070897 A1 | 4/2004 | Wu et al. | |
| 2015/0116872 A1 * | 4/2015 | Li | H01R 13/713 361/42 |

FOREIGN PATENT DOCUMENTS

| | | | |
|---|---|---|---|
| CA | 2458758 A1 | 8/2005 |
| CN | 2906903 Y | 5/2007 |
| CN | 221994825 U | 11/2024 |
| JP | H08205430 A | 8/1996 |

* cited by examiner

*Primary Examiner* — Danny Nguyen

(57) ABSTRACT

Disclosed is an intelligent high-power ground fault circuit interrupter (GFCI) plug. The plug includes a leakage detection device, a driving device and a printed circuit board (PCB), where when the leakage detection device detects leakage, the driving device acts to disconnect a circuit. The driving device includes a coil and a driving rod, a current is input the coil, and the driving rod is driven to act, such that a moving contact is in communication with or disconnected from a stationary contact. A permanent magnet assembly is further included. Due to the position of the permanent magnet assembly, when the moving contact is in communication with the stationary contact, the permanent magnet assembly and the driving rod are magnetically attracted and maintained.

4 Claims, 4 Drawing Sheets

INTELLIGENT HIGH-POWER GFCI PLUG

CROSS-REFERENCE TO RELATED APPLICATIONS

The present application claims priority to Chinese Patent Application No. 2024114051784, filed on Oct. 10, 2024, the entire disclosure of which is incorporated herein by reference.

TECHNICAL FIELD

The present disclosure relates to an intelligent high-power ground fault circuit interrupter (GFCI) plug.

BACKGROUND

An intelligent high-power ground fault circuit interrupter (GFCI) plug is a plug which is supplied in the North American market and has a leakage protection function for high-power electrical appliances. Common high-power electrical appliances include electric water heaters. The principle of an existing low-voltage leakage protection plug is that a current sensor is utilized to detect a current flowing, and when leakage is detected, an electromagnetic mode is employed for tripping, such that personal safety of a user is protected. After tripping, reset is required to connect a moving contact and a stationary contact before normal use. Generally, mechanical or electromagnetic reset is employed. When the electromagnetic reset is employed, a coil needs to be continuously energized or otherwise maintained by using a locking structure. After another electromagnetic coil is used for driving an unlocking mechanism to perform unlocking through ingenious design, and tripping and power failure are realized. Structures of the above two modes are relatively complex.

SUMMARY

Aiming at the defects mentioned above, an objective of the present disclosure is to provide an intelligent ground fault circuit interrupter (GFCI) plug which is simple and reliable in structure.

Thus, the intelligent high-power GFCI plug of the present disclosure includes a leakage detection device, a driving device and a printed circuit board (PCB), where when the leakage detection device detects leakage, the driving device acts to disconnect a circuit. The driving device includes a coil and a driving rod, a current is input the coil, and the driving rod is driven to act, such that a moving contact is in communication with or disconnected from a stationary contact. A permanent magnet assembly is further included, due to the position of the permanent magnet assembly, when the moving contact is in communication with the stationary contact, the permanent magnet assembly and the driving rod are magnetically attracted and maintained.

Preferably, a first end of the driving rod is connected to a movable bracket, the movable bracket is provided with the moving contact, and the stationary contact is arranged in the direction, towards a second end of the driving rod, of the moving contact, such that the movable bracket moves towards the direction of the second end of the driving rod to connect the moving contact and the stationary contact. The permanent magnet assembly matches the second end of the driving rod.

Preferably, the intelligent high-power GFCI plug includes a fixed bracket, and the fixed bracket includes a coil tube. The coil is arranged in the coil tube, and the coil tube and the coil are coaxially arranged on the driving rod in a sleeving manner. One end of the coil tube is connected to a mounting groove of the permanent magnet assembly, and a circular sheet type permanent magnet block is arranged in the mounting groove.

Preferably, the other end of the coil tube is connected to a stationary contact fixing plate, an upper end of the stationary contact fixing plate is connected to a supporting frame, the supporting frame is erected above the movable bracket, and clamping pins are arranged on the supporting frame to be connected to the PCB in a clamped manner.

Preferably, the movable bracket is provided with a limiting groove, and a limiting block is clamped into the limiting groove. A middle of the limiting block is provided with a hole, the first end of the driving rod extends into the hole of the limiting block, and the first end of the driving rod is provided with a groove to be connected to the limiting block in a clamped manner.

Preferably, the supporting frame is provided with a sliding groove, an upper end of the limiting block is provided with an outward extension section, and the extension section extends to a surface of the sliding groove, such that the supporting frame slides along the sliding groove.

Preferably, the intelligent high-power GFCI plug further includes a plug fixing seat, and the fixed bracket is arranged in the plug fixing seat. The plug fixing seat includes plug copper assembly limiting strips at two sides, and gaps are provided in the limiting strips and a plug fixing seat body for a plug copper assembly to pass through. The plug copper assembly is bent on a lower surface of the plug fixing seat, extends to a side surface of the plug fixing seat, and extends from the gaps to the stationary contact fixing plate to form to a stationary contact plate, and the stationary contact is fixed on the stationary contact plate.

Preferably, the leakage detection device includes a current transformer, and the moving contact is connected to a wiring copper assembly. The wiring copper assembly includes a wiring terminal, the wiring terminal is connected to a connecting copper sheet, and the connecting copper sheet connected to a neutral wire and a live wire passes through the current transformer.

Preferably, the connecting copper sheet connected to the neutral wire and the live wire is separated by a partition plate in a middle of the current transformer.

Preferably, the intelligent high-power GFCI plug includes a test key and a reset key, where the test key and the reset key are mounted on a housing body, the housing body is fixed to a base, the leakage detection device, the PCB and the driving device are mounted in an accommodating cavity formed between the housing body and the base, and a middle frame is connected between the base and the housing body.

The present disclosure has the beneficial technical effects:

(1) According to the intelligent high-power GFCI plug provided by the present disclosure, the driving device includes the coil, the coil is energized, and the driving rod generates electromagnetic force, so as to drive the moving contact and the stationary contact to be closed. The second end of the driving rod is in contact with a magnet block, and the coil is kept close under the action of magnetic force between the magnet block and the driving rod after the coil is de-energized. When the leakage detection device detects leakage, a control circuit controls a reverse current to be input into the coil, the driving rod moves in an opposite direction under action of the electromagnetic force, and the moving contact and the stationary contact are separated.

(2) In particular examples of the present disclosure, the driving rod is arranged in the fixed bracket, one end of the driving rod is connected to the movable bracket, the movable bracket is connected to the first end of the driving rod through one limiting block, and an upper end of the limiting block is provided with the extension section to match the sliding groove at the supporting frame of the fixed bracket, such that the movable bracket moves stably.

Figure 1:
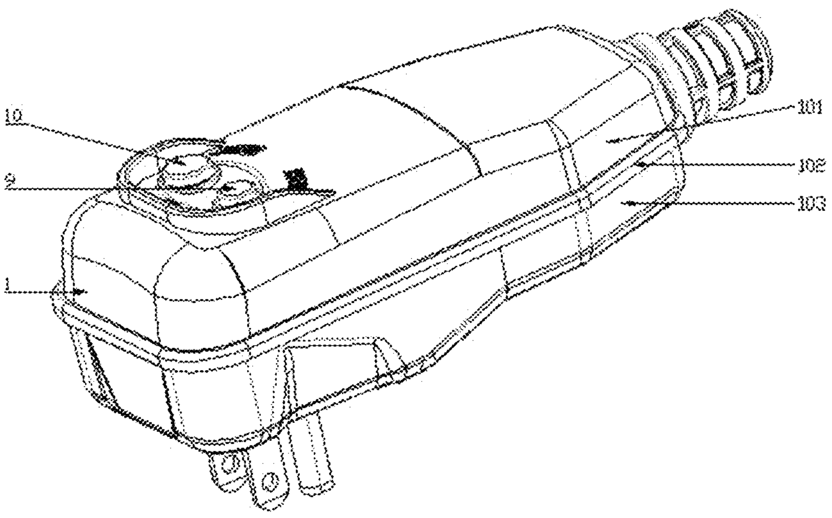
FIG. 1 is a schematic diagram of a particular example for implementing the present disclosure.

Reference numerals in figures: 1. housing; 101. housing body; 102. middle frame; 103. base; 2. printed circuit board (PCB); 3. driving device; 301. driving rod; 3011. first end; 3012. second end; 302. fixed bracket; 3021. coil tube; 303. movable bracket; 3031. limiting groove; 3032. limiting block; 3033. extension section; 304. moving contact plate; 305. mounting groove; 306. tail seat; 307. stationary contact fixing plate; 308. supporting frame; 3081. sliding groove; 309. stationary contact plate; 4. leakage detection device; 401. partition plate; 5. clamping pin; 6. plug fixing seat; 601. limiting strip; 7. plug body; 701. plug copper assembly; 8. wiring copper assembly; 801. wiring terminal; 802. connecting copper sheet; 9. test key; 10. reset key; and 11. pin.

DETAILED DESCRIPTIONS OF THE EMBODIMENTS

The present disclosure is described in detail below in combination with the drawings and the preferred examples.

Referring to FIGS. 1-8, an intelligent high-power ground fault circuit interrupter (GFCI) plug of the present disclosure includes a leakage detection device 4, a driving device 3 and a printed circuit board (PCB) 2, where when the leakage detection device 4 detects leakage, the driving device 3 acts to disconnect a circuit. The driving device 3 includes a coil and a driving rod 301, a current is input the coil, and the driving rod 301 is driven to act, such that a moving contact is in communication with or disconnected from a stationary contact. A permanent magnet assembly is further included. Due to the position of the permanent magnet assembly, when the moving contact is in communication with the stationary contact, the permanent magnet assembly and the driving rod 301 are magnetically attracted and maintained. A common leakage detection device 4 uses a zero-sequence current transformer and includes a coil. A live wire and a neutral wire pass through the coil. When leakage occurs, currents on the live wire and the neutral wire will be different. The current transformer can detect the current difference on the live wire and the zero wire, and a control component integrated on the PCB 2 can receive a leakage signal and control the driving device 3 to disconnect a circuit. The driving device 3 includes a coil and a coaxially arranged metal driving rod 301. When a current is input into the coil, the driving rod 301 moves by electromagnetic force and makes contact with the stationary contact with the moving contact, and the circuit of the plug is connected. At the same time, the driving rod 301 makes contact with the permanent magnet assembly, the permanent magnet assembly is a magnet block, and magnetic attraction force of the permanent magnet assembly acts on the driving rod 301, such that the moving contact and the stationary contact are kept in contact. Under the action of the permanent magnet assembly, the coil can keep a switch closed without being kept energized or other locking devices. The leakage detection device 4, the driving device 3 and the PCB 2 are mounted in an accommodating cavity of a housing 1 of the plug, the housing 1 includes a housing body 101 at an upper portion and a base 103 at a lower portion, and the base 103 and the housing body 101 are connected to a middle frame 102. The housing 1 is made of plastic, the middle frame 102 is made of a metal material to play a supporting role, and the base 103, the housing body 101 and the middle frame 102 are fixed by bolts. A lead wire extends from the tail of the housing body 101 and is connected to a wiring terminal 801 of a wiring copper assembly 8, the wiring terminal 801 is connected to the neutral wire, the live wire or a ground wire, and the wiring terminal 801 is connected to the moving contact. The stationary contact is connected to pins 11, the pins 11 are arranged below the driving device, and the overall structure of the plug is compact.

Referring to FIGS. 2-8, the structure of the driving device 3 mainly includes a driving rod 301 and a fixed bracket 302, where the fixed bracket 302 includes a coil tube 3021, the coil is arranged in the coil tube 3021, a rod body portion of the driving rod 301 is arranged in the coil tube 3021, and in this example, the coil tube and the driving rod are coaxially arranged. A first end 3011 of the driving rod 301 is connected to the movable bracket 303. Specifically, the movable bracket 303 includes a longitudinal plate, and a limiting groove 3031 is provided in a middle of the longitudinal plate. The limiting groove 3031 is a dovetail groove, and a limiting block 3032 matching the dovetail groove is clamped into the dovetail groove. The limiting block 3032 is connected to the first end 3011 of the driving rod in a clamped manner, and a hole is provided at the position where the limiting block 3032 matches the first end 3011 of the driving rod. The first end 3011 of the driving rod is of a stepped rod structure, and a groove is provided at the first end 3011. The first end 3011 extends into the hole and can be fixed by a nut. A connecting copper sheet 802 of the wiring copper assembly 8 passes through the current transformer, both ends of the longitudinal plate of the movable bracket 303 are provided with a sheet-like copper assembly to form a moving contact plate 304, and the moving contact can be fixed on the moving contact plate 304. The moving contact plate 304 and the wiring copper assembly 8 can be connected through the lead wire, and the lead wire is reserved with a certain length to adapt to movement of the movable bracket 303. Preferably, one end of the coil tube 3021 of the fixed bracket is connected to a mounting groove 305 of the permanent magnet assembly, a surface of a second end 3012 of the driving rod matches the permanent magnet assembly, and the mounting groove 305 can be arranged in a column body. The mounting groove 305 is cylindrical in shape, the mounting groove 305 is in communication with the coil tube 3021, and a circular magnet block is arranged in the mounting groove 305. A tail seat 306 which can be detachably connected can be mounted at the tail of the mounting groove 305, and the tail seat 306 and the mounting groove 305 cooperate to fix the magnet block. Preferably, the other end of the coil tube 3021 of the fixed bracket is connected to a stationary contact fixing plate 307, and the movable bracket 303 is arranged outside the stationary contact fixing plate 307. The driving rod 301 passes through the stationary contact fixing plate 307, the stationary contact is arranged on the stationary contact fixing plate, and an upper end of the stationary contact fixing plate 307 is connected to supporting frames 308. In this example, the movable bracket 303 is arranged on the first end of the driving rod 301, and the fulcrum of moment is at one end of the coil tube 3021. During a moving process, one end of the movable bracket 303 droops under influence of the moment, and the supporting frame 308 can be used for providing a supporting force to support the movable bracket 303 to move along a predetermined path. Specifically, both sides of the stationary contact fixing plate 307 are provided with supporting frames 308, the supporting frames 308 are arranged above the movable bracket 303, and clamping pins 5 are arranged on the supporting frames 308 to be connected to the PCB 2 in a clamped manner. A space is reserved between the supporting frames 308 on both sides, a width of the reserved space matches a width of an upper portion of the limiting block 3032 of the movable bracket 303, and an outward extension section 3033 is arranged on the upper portion of the limiting block 3032. Sliding grooves 3081 are provided at the supporting frames 308, and the sliding grooves 3081 cooperate with the extension section 3033, such that the movable bracket 303 stably moves along the sliding grooves 3081. In this example, when the leakage detection device 4 detects leakage, a reverse current is input to the coil in the fixed bracket 302, the driving rod 301 is separated from the magnet block by a reverse electromagnetic force, and the driving rod 301 drives the movable bracket 303, such that the moving contact and the stationary contact are separated. When the movable bracket 303 moves to the vicinity of the leakage detection device 4 adjacent to the movable bracket, the second end 3012 of the driving rod 301 keeps a long distance from the permanent magnet assembly, the magnetic attraction force of the permanent magnet assembly is very small and can be ignored, and the moving contact and the stationary contact keep separated.

Figure 2:
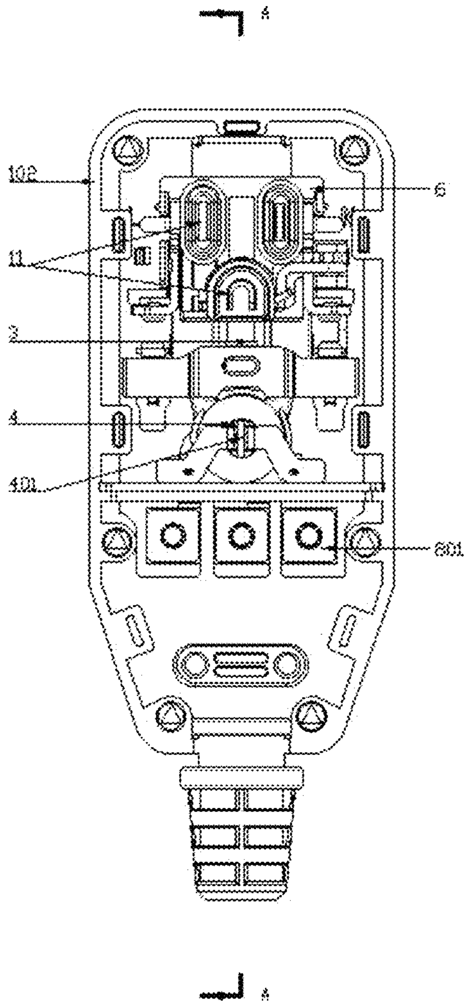
FIG. 2 is a schematic diagram from a top view of an internal structure of a plug.
Figure 3:
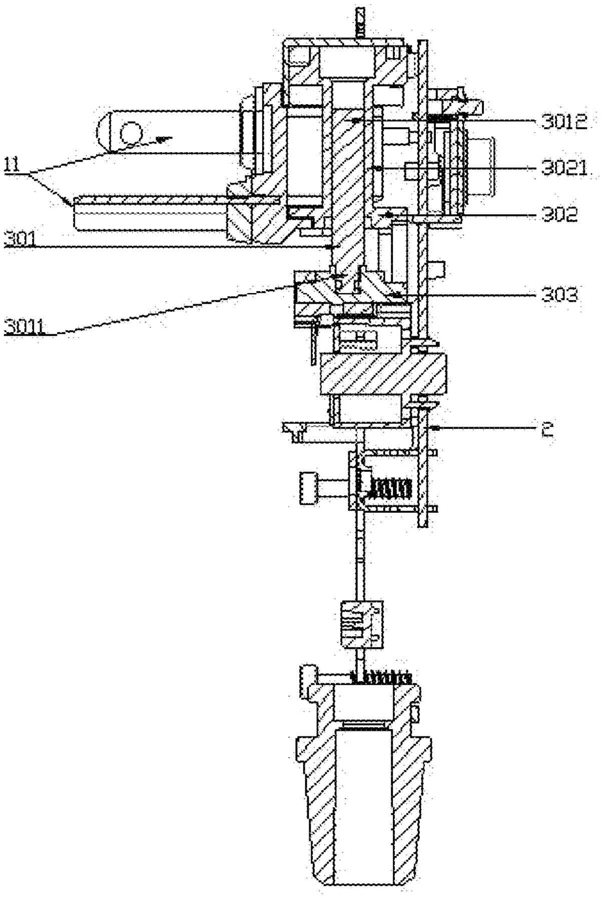
FIG. 3 is a schematic diagram from a sectional view of FIG. 2.
Figure 4:
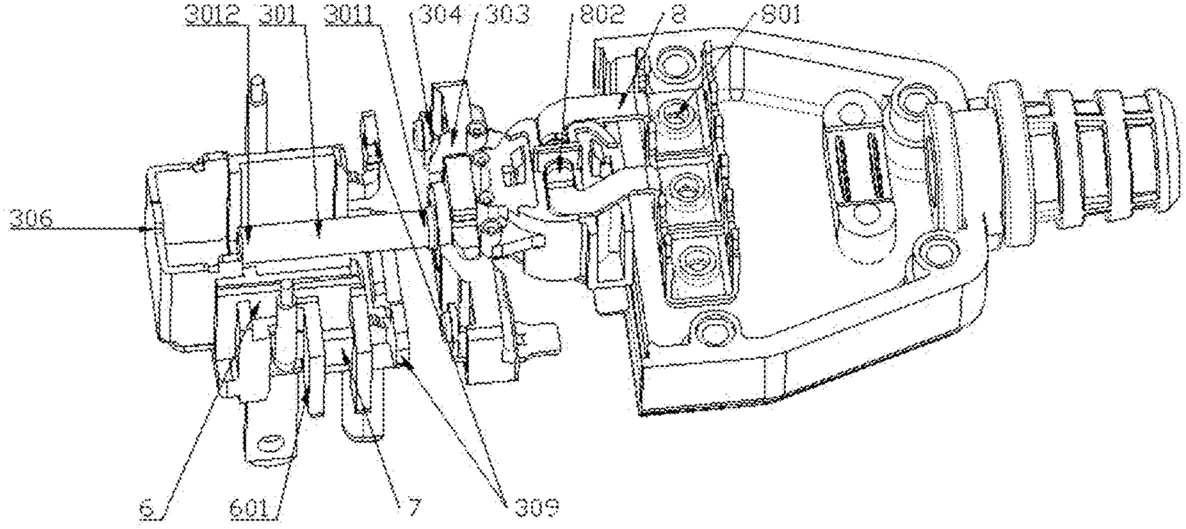
FIG. 4 is a schematic diagram of a driving rod, a movable bracket and a wiring terminal.
Figure 5:
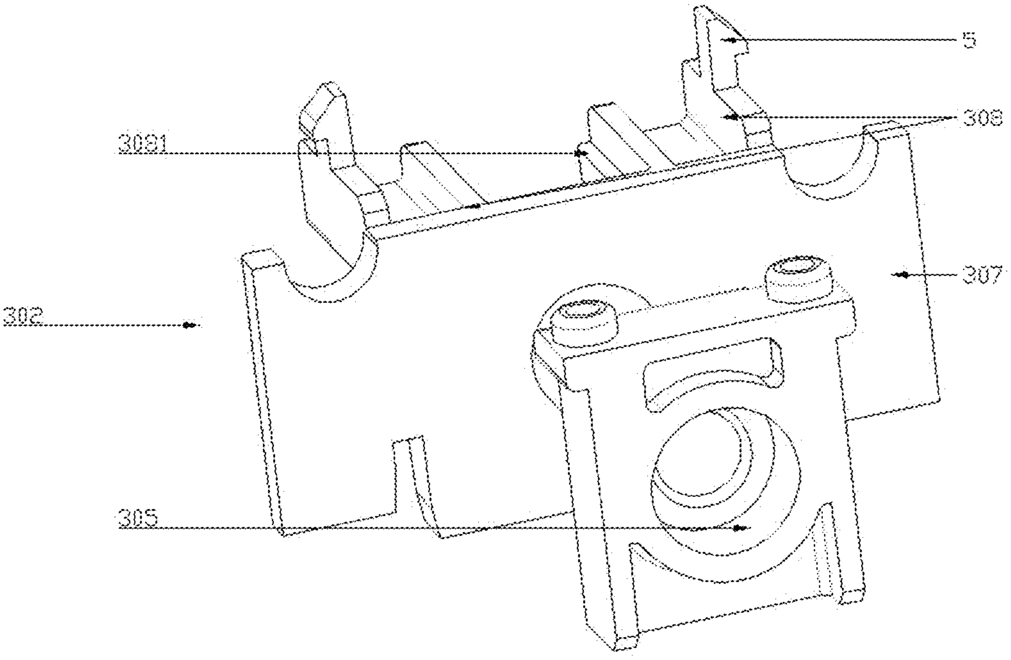
FIG. 5 is a schematic diagram of a fixed bracket.
Figure 6:
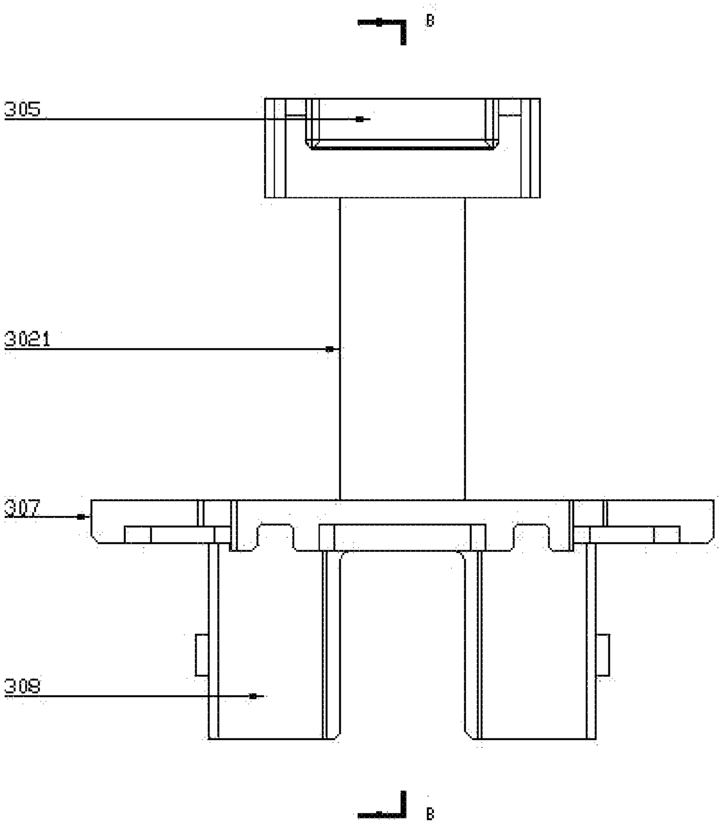
FIG. 6 is a top view of a fixed bracket.
Figure 7:
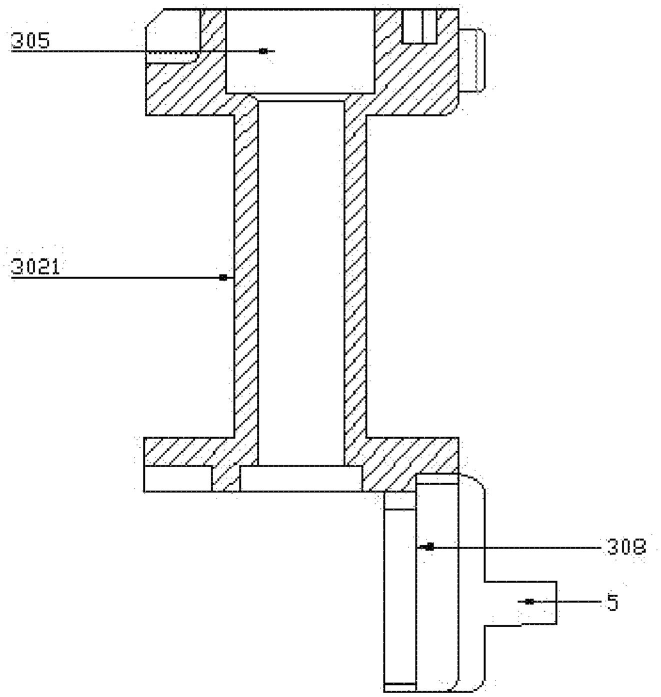
FIG. 7 is a schematic diagram from a sectional view of FIG. 6.
Figure 8:
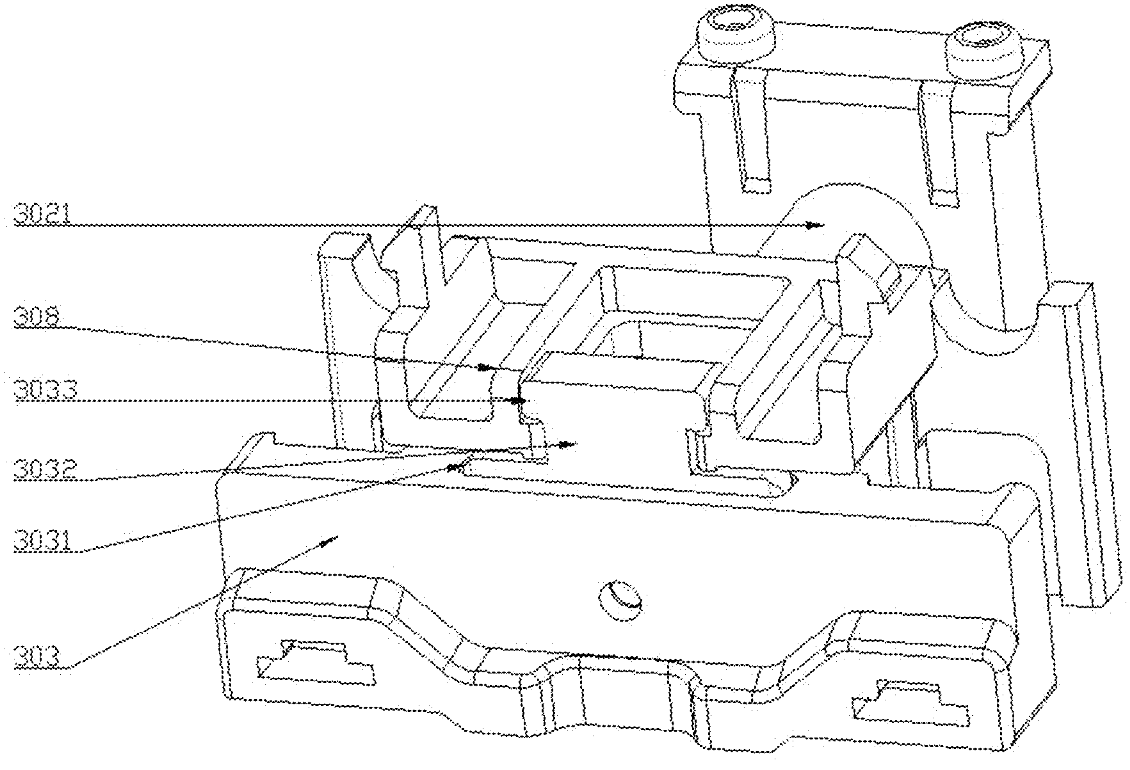
FIG. 8 is a schematic diagram after combination between a fixed bracket, a movable bracket and a driving rod.

In the above examples, referring to FIG. 2 and FIG. 4, the intelligent high-power GFCI plug further includes a plug fixing seat 6, and the fixed bracket 302 is arranged in the plug fixing seat 6. The plug fixing seat 6 includes plug copper assembly limiting strips 601 at two sides, and gaps are provided in the limiting strips 601 and a plug fixing seat body for a plug copper assembly 7 to pass through. The plug copper assembly is connected to pins 11, and the pins 11 are fixed on a lower surface of the plug fixing seat 6. The plug copper assembly extends to a side surface of the plug fixing seat 6 from the lower surface of the plug fixing seat 6, and extends from the gaps to the stationary contact fixing plate 307 to form to a stationary contact plate 309, and the stationary contact is fixed on the stationary contact plate 309.

In the above examples, referring to FIG. 2, the intelligent high-power GFCI plug further includes the current transformer, and the moving contact is connected to the wiring copper assembly 8. The wiring copper assembly 8 includes the wiring terminal 801, the wiring terminal 801 is connected to a connecting copper sheet 802, and the connecting copper sheet 802 connected to the neutral wire and the live wire passes through the current transformer. The connecting copper sheet 802 connected to the neutral wire and the live wire is separated by a partition plate 401 in a middle of the current transformer.

In the above examples, referring to FIG. 1, the intelligent high-power GFCI plug further includes a test key 9 and a reset key, where the test key 9 and the reset key are mounted on the housing body 101, and the test key 9 and the reset key 10 can be arranged according to the prior art.

What is claimed is:

1. An intelligent high-power ground fault circuit interrupter (GFCI) plug, comprising a leakage detection device, a driving device and a printed circuit board (PCB), wherein when the leakage detection device detects leakage, the driving device acts to disconnect a circuit, the driving device comprises a coil and a driving rod, a current is applied to the coil, and the driving rod is driven to act, such that a moving contact is in communication with or disconnected from a stationary contact, and the driving device further comprises a permanent magnet assembly, due to the position of the permanent magnet assembly, when the moving contact is in communication with the stationary contact, the permanent magnet assembly and the driving rod are magnetically attracted and maintained;

wherein a first end of the driving rod is connected to a movable bracket, the movable bracket is provided with the moving contact, the stationary contact is arranged in the direction, towards a second end of the driving rod, of the moving contact, such that the movable bracket moves towards the direction of the second end of the driving rod to connect the moving contact and the stationary contact, and the permanent magnet assembly matches the second end of the driving rod;

wherein the intelligent high-power GFCI plug further comprises a fixed bracket, wherein the fixed bracket comprises a coil tube, the coil is arranged in the coil tube, the coil tube and the coil are coaxially arranged on the driving rod in a sleeving manner, one end of the coil tube is connected to a mounting groove of the permanent magnet assembly, and a circular sheet type permanent magnet block is arranged in the mounting groove;

wherein the other end of the coil tube is connected to a stationary contact fixing plate, an upper end of the stationary contact fixing plate is connected to a supporting frame, the supporting frame is erected above the movable bracket, and clamping pins are arranged on the supporting frame to be connected to the PCB in a clamped manner;

wherein the movable bracket is provided with a limiting groove, a limiting block is clamped into the limiting groove, a middle of the limiting block is provided with a hole, the first end of the driving rod extends into the hole of the limiting block, and the first end of the driving rod is provided with a groove to be connected to the limiting block in a clamped manner;

wherein the supporting frame is provided with a sliding groove, an upper end of the limiting block is provided with an outward extension section, and the extension section extends to a surface of the sliding groove, such that the supporting frame slides along the sliding groove; and wherein the intelligent high-power GFCI plug further comprises a plug fixing seat, wherein the fixed bracket is arranged in the plug fixing seat, the plug fixing seat comprises plug copper assembly limiting strips at two sides, gaps are provided in the limiting strips and a plug fixing seat body for a plug copper assembly to pass through, the plug copper assembly is bent on a lower surface of the plug fixing seat, extends to a side surface of the plug fixing seat, and extends from the gaps to the stationary contact fixing plate to form to a stationary contact plate, and the stationary contact is fixed on the stationary contact plate.

2. The intelligent high-power GFCI plug according to claim 1, wherein the leakage detection device comprises a current transformer, the moving contact is connected to a wiring copper assembly, the wiring copper assembly comprises a wiring terminal, the wiring terminal is connected to a connecting copper sheet, and the connecting copper sheet connected to a neutral wire and a live wire passes through the current transformer.

3. The intelligent high-power GFCI plug according to claim 2, wherein the connecting copper sheet connected to the neutral wire and the live wire is separated by a partition plate in a middle of the current transformer.

4. The intelligent high-power GFCI plug according to claim 1, further comprising a test key and a reset key, wherein the test key and the reset key are mounted on a housing body, the housing body is fixed to a base, the leakage detection device, the PCB and the driving device are mounted in an accommodating cavity formed between the housing body and the base, and a middle frame is connected between the base and the housing body.

* * * * *